United States Patent
Czainski et al.

(10) Patent No.: US 9,751,415 B2
(45) Date of Patent: Sep. 5, 2017

(54) PROVIDING A LAND VEHICLE, IN PARTICULAR A RAIL VEHICLE OR A ROAD AUTOMOBILE, WITH ELECTRIC ENERGY BY INDUCTION

(71) Applicant: Bombardier Transportation GmbH, Berlin (DE)

(72) Inventors: Robert Czainski, Szczecin (PL); Konrad Woronowicz, Kingston (CA); Federico Garcia, Mannheim (DE); Marnix Lannoije, Balen (BE)

(73) Assignee: Bombardier Transportation GmbH, Berlin (DE)

( * ) Notice: Subject to any disclaimer, the term of this patent is extended or adjusted under 35 U.S.C. 154(b) by 391 days.

(21) Appl. No.: 14/396,226

(22) PCT Filed: Apr. 23, 2013

(86) PCT No.: PCT/EP2013/058399
§ 371 (c)(1),
(2) Date: Oct. 22, 2014

(87) PCT Pub. No.: WO2013/160305
PCT Pub. Date: Oct. 31, 2013

(65) Prior Publication Data
US 2015/0075934 A1 Mar. 19, 2015

(30) Foreign Application Priority Data
Apr. 23, 2012 (GB) .................................. 1207143.7

(51) Int. Cl.
*B60L 11/18* (2006.01)
*B60L 5/00* (2006.01)
(Continued)

(52) U.S. Cl.
CPC ............. *B60L 11/182* (2013.01); *B60L 5/005* (2013.01); *B60M 7/003* (2013.01); *H01F 27/36* (2013.01);
(Continued)

(58) Field of Classification Search
CPC ...... B60L 5/005; B60L 11/182; Y02T 90/122; H01F 27/36; H01F 27/362; H01F 27/365; H02J 5/005
See application file for complete search history.

(56) References Cited

U.S. PATENT DOCUMENTS 4,331,225 A 5/1982 Bolger
5,207,304 A 5/1993 Lechner et al.
(Continued)

FOREIGN PATENT DOCUMENTS

CN 1018356653 A 9/2010
DE 102011056807 A1 * 6/2013 ............. B62D 25/20
(Continued)

*Primary Examiner* — Zachary Kuhfuss
(74) *Attorney, Agent, or Firm* — The Webb Law Firm (57) ABSTRACT

An arrangement for providing a land vehicle, with electric energy includes producing an electromagnetic field on a primary side located on the track of the vehicle and/or located at a stop of the vehicle, by receiving the magnetic component of the electromagnetic field on a secondary side on board the vehicle above the source of the electromagnetic field and by magnetic induction on the secondary side. The arrangement includes a secondary side conductor assembly made of electrically conducting material which produces an electromagnetic stray field during operation while the electrically conducting material carries an alternating electric current and a secondary side shielding assembly made of magnetizable material. The secondary side shielding assembly extends sideways of the secondary side conductor assembly on the same level as the secondary side conductor (Continued)

assembly, thereby shielding regions, which are located beyond the magnetizable material, from the electromagnetic stray field.

5 Claims, 4 Drawing Sheets

(51) Int. Cl.
  *B60M 7/00* (2006.01)
  *H01F 27/36* (2006.01)
  *H01F 38/14* (2006.01)
  *H02J 5/00* (2016.01)

(52) U.S. Cl.
  CPC ........... *H01F 27/365* (2013.01); *H01F 38/14* (2013.01); *H02J 5/005* (2013.01); *B60L 2200/26* (2013.01); *B60L 2270/147* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 5,656,983 A | 8/1997 | Ito et al. | |
| 9,428,059 B2* | 8/2016 | Galamb | B60L 3/0046 |
| 2007/0064406 A1 | 3/2007 | Beart | |
| 2008/0129246 A1 | 6/2008 | Morita et al. | |
| 2010/0225271 A1* | 9/2010 | Oyobe | B60L 5/005 |
| | | | 320/108 |
| 2011/0187317 A1 | 8/2011 | Mitkake et al. | |
| 2012/0242447 A1 | 9/2012 | Ichikawa | |
| 2013/0038135 A1* | 2/2013 | Ichikawa | B60L 11/182 |
| | | | 307/104 |
| 2013/0181667 A1* | 7/2013 | Takeshita | B60L 11/182 |
| | | | 320/108 |
| 2014/0346815 A1* | 11/2014 | Keutz | B62D 25/20 |
| | | | 296/193.07 |
| 2015/0210170 A1 | 7/2015 | Oyobe et al. | |
| 2015/0262750 A1* | 9/2015 | Blum | H01F 27/36 |
| | | | 320/108 |
| 2015/0321566 A1* | 11/2015 | Czainski | B60L 11/1824 |
| | | | 191/10 |
| 2016/0068069 A1* | 3/2016 | Percebon | B60L 11/182 |
| | | | 307/104 |
| 2016/0250934 A1* | 9/2016 | Yuasa | H01F 38/14 |
| | | | 307/104 |
| 2016/0355094 A1* | 12/2016 | Yamakawa | B60L 1/06 |

FOREIGN PATENT DOCUMENTS

| | | |
|---|---|---|
| EP | 2196351 A1 | 6/2010 |
| GB | 2020451 A | 11/1979 |
| JP | S57160758 A | 10/1982 |
| JP | 2011045189 A | 3/2011 |
| JP | 2011236892 A | 11/2011 |
| WO | 9831073 A2 | 7/1998 |
| WO | 2005024865 A2 | 3/2005 |
| WO | 2009071175 A2 | 6/2009 |
| WO | 2010000495 A1 | 1/2010 |
| WO | 20100098547 A2 | 9/2010 |
| WO | 2011074091 A1 | 6/2011 |

* cited by examiner

Fig. 7

PROVIDING A LAND VEHICLE, IN PARTICULAR A RAIL VEHICLE OR A ROAD AUTOMOBILE, WITH ELECTRIC ENERGY BY INDUCTION

CROSS-REFERENCE TO RELATED APPLICATIONS

This application is the U.S. national phase of International Application No. PCT/EP2013/058399 filed Apr. 23, 2013, and claims priority to United Kingdom Patent Application No. 1207143.7 filed Apr. 23, 2012, the disclosures of which are hereby incorporated in their entirety by reference.

BACKGROUND OF THE INVENTION

Field of the Invention

The invention relates to an arrangement for providing a land vehicle, in particular a rail vehicle or a road automobile, with electric energy. An electromagnetic field is produced on a primary side located on the track of the vehicle and/or located at a stop of the vehicle by a source (typically windings and/or coils of an electric conductor). The magnetic component of the electromagnetic field is received on a secondary side onboard the vehicle above the source of the electromagnetic field. By magnetic induction on the secondary side, the electric energy is produced. The invention also relates to a corresponding method of providing a land vehicle with electric energy. Furthermore, the invention relates to a land vehicle, in particular a rail vehicle or a road automobile, comprising the arrangement.

However, some but not all aspects of the present invention relate to a system which includes the primary side and the secondary side. Rather, one aspect of the invention only relates to the primary side and another aspect of the invention only relates to the secondary side.

The terms "primary side" and "secondary side" are used corresponding to the terminology which is used for transformers. In fact, the electric parts of a system for transferring electric energy from a vehicle track or from vehicles stop to the vehicle by induction (inductive power transfer system, in short: IPT system) form a kind of transformer. The only difference compared to a conventional transformer is the fact that the vehicle, and thus the secondary side, can move.

Description of Related Art

WO 2010/000495 A1 describes a system and method for transferring electric energy to a vehicle. The energy can be transferred to the vehicle while the vehicle is moving. While the present invention may relate to such a system, it is not restricted to the transfer of energy to moving vehicles. Rather, the energy maybe transferred while the vehicle temporarily stops (such as a bus at a bus stop) or while the vehicle is parked.

The vehicle may be any land vehicle, including track bound vehicles, such as conventional rail vehicles, monorail vehicles, trolley busses and vehicles which are guided on a track by other means. Other examples of land vehicles are road automobiles, including busses which are not track bound. For example, the vehicle may be a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

WO 2010/000495 A1 describes an example of serpentine windings on the primary side for producing the electromagnetic field. The primary side conductor assembly of the present invention, which is made of electrically conducting material that produces the electromagnetic field during operation while the electrically conducting material carries an alternating electric current, may have the same or a different configuration. In any case, at least sections and/or parts of the primary side conductor assembly has/have a length and a width, so that the primary side conductor assembly comprises lateral edges. For example, as described in WO 2010/000495 A1, sections of the primary side conductor assembly may extend along the track of the vehicle so that there are two lateral edges on opposite sides of the primary side conductor assembly. Other configurations are possible such as elongated electric conductors extending in the direction of travel, coils of electric conductors having several windings and arrangements of electric conductors having different configurations.

The features of a primary side conductor assembly which are described in the foregoing description may also apply to a secondary side conductor assembly, with the exception that this assembly is located on board the vehicle.

In any case, there is a gap between the primary side conductor assembly and the secondary side conductor assembly which causes emissions of the electromagnetic field, which is produced by the primary side conductor assembly, to the surroundings. In addition, an electric current flows through the secondary side conductor assembly during operation and this electric current also causes an electromagnetic field, which is denoted by "electromagnetic stray field" in the following. This stray field also causes emission of electromagnetic radiation to the surroundings.

Corresponding limit values, in particular of the electromagnetic or magnetic field strength, must be observed. In principle, the larger the gap between the primary side and the secondary side, the larger the field strength in the surroundings.

SUMMARY OF THE INVENTION

It is an object of the present invention to reduce the emission of magnetic radiation to the surroundings of a system for providing a land vehicle with electric energy by induction. Alternatively, it is an object of the present invention to increase the transfer power from the primary side to the secondary side without increasing the emissions to the surroundings compared to conventional systems.

According to a basic idea of the present invention, magnetizable material is used to shield the surroundings from the electromagnetic field(s) produced by the primary side conductor assembly and/or produced by the secondary side conductor assembly. Therefore, a shielding assembly made of magnetizable material is combined with the conductor assembly. The shielding assembly or a part of the shielding assembly extends sideways of the respective conductor assembly on the same height level (in short: level) as the conductor assembly. In addition or alternatively, the shielding assembly or a part of the shielding assembly extends above and/or below the respective conductor assembly. As a result, regions which are located beyond the magnetizable material (if viewed from the conductor assembly) are shielded from the magnetic field produced by the conductor assembly.

Shielding the surroundings from the electromagnetic field is effected in particular by reducing the strength of the magnetic component of the electromagnetic field.

In particular, the following is proposed: An arrangement for providing a land vehicle, in particular a rail vehicle or a road automobile, with electric energy by producing an electromagnetic field on a primary side located on the track of the vehicle and/or located at a stop of the vehicle, by receiving the magnetic component of the electromagnetic field on a secondary side onboard the vehicle above the source of the electromagnetic field and by magnetic induction on the secondary side, wherein the arrangement comprises a primary side conductor assembly made of electrically conducting material which produces the electromagnetic field during operation while the electrically conducting material carries an alternating electric current, a primary side shielding assembly made of magnetizable material wherein the primary side shielding assembly or a part of the primary side shielding assembly extends sideways of the primary side conductor assembly on the same level as the primary side conductor assembly, thereby shielding regions, which are located beyond the magnetizable material, from the electromagnetic field.

In addition or alternatively, an arrangement is proposed for providing a land vehicle, in particular a rail vehicle or a road automobile, with electric energy by producing an electromagnetic field on a primary side located on the track of the vehicle and/or located at a stop of the vehicle, by receiving the magnetic component of the electromagnetic field on a secondary side onboard the vehicle above the source of the electromagnetic field and by magnetic induction on the secondary side, wherein the arrangement comprises a secondary side conductor assembly made of electrically conducting material which produces an electromagnetic stray field during operation while the electrically conducting material carries an alternating electric current, a secondary side shielding assembly made of magnetizable material wherein the secondary side shielding assembly or a part of the secondary side shielding assembly extends sideways of the secondary side conductor assembly on the same level as the secondary side conductor assembly, thereby shielding regions, which are located beyond the magnetizable material, from the electromagnetic stray field.

Furthermore, a method is proposed of providing a land vehicle, in particular a rail vehicle or a road automobile, with electric energy by producing an electromagnetic field on a primary side located on the track of the vehicle and/or located at a stop of the vehicle, for receiving the magnetic component of the electromagnetic field on a secondary side onboard the vehicle above the source of the electromagnetic field by magnetic induction on the secondary side, wherein the electromagnetic field is produced by conducting an alternating electric current through a primary side conductor assembly made of electrically conducting material, regions, which are located sideways of the primary side conductor assembly, are shielded from the electromagnetic field using a primary side shielding assembly, which or a part of which extends sideways of the primary side conductor assembly on the same level as the primary side conductor assembly, wherein the primary side shielding assembly is made of magnetizable material.

In addition or alternatively, a method is proposed of providing a land vehicle, in particular a rail vehicle or a road automobile, with electric energy by receiving, on a secondary side onboard the vehicle, a magnetic component of the electromagnetic field produced on a primary side located below the vehicle on the track of the vehicle and/or at a stop of the vehicle, and by using magnetic induction on the secondary side, wherein the electromagnetic field is received by a secondary side conductor assembly made of electrically conducting material which produces an electromagnetic stray field during operation while the electrically conducting material carries an alternating electric current, regions, which are located sideways of the secondary side conductor assembly, are shielded from the electromagnetic stray field using a secondary side shielding assembly, which or a part of which extends sideways of the secondary side conductor assembly on the same level as the secondary side conductor assembly, wherein the secondary side shielding assembly is made of magnetizable material.

In any case, it is preferred that the primary side shielding assembly made of magnetizable material also extends below the primary side conductor assembly. In addition or alternatively, the secondary side shielding assembly made of magnetizable material may also extend above the secondary side conductor assembly. Preferably, all lateral edges of the primary side conductor assembly and/or secondary side conductor assembly are shielded by the primary or secondary side shielding assembly in the manner described above or below. In particular, the magnetizable material may continuously extend from the region next to one lateral edge of the conductor assembly to the region next to another lateral edge (e.g. located opposite to the first lateral edge). As a result, more regions of the surroundings are shielded from the electromagnetic field.

Preferably, a primary side shielding assembly is used at the same time or in the same system as a secondary side shielding assembly. Both shielding assemblies are made of magnetizable material and shield the respective conductor assembly sideways of the conductor assembly.

Preferably, the primary side shielding assembly extends from sideways of the primary side conductor assembly to a level above the level of a lateral edge of the primary side conductor assembly, thereby also shielding regions, which are located beyond the magnetizable material and at a higher level as the lateral edge, from the electromagnetic field.

Therefore, the shielded regions of the surroundings are enlarged, which is especially useful if the gap between the primary side conductor assembly and the secondary side conductor assembly is large. The same advantage applies to the following preferred embodiment of the secondary side shielding assembly, which extends from sideways of the secondary side conductor assembly to a level below the level of a lateral edge of the secondary side conductor assembly, thereby also shielding regions, which are located beyond the magnetizable material and at a lower level as the lateral edge, from the electromagnetic stray field.

According to another preferred embodiment, the primary side shielding assembly extends into a region above the lateral edge of the primary side conductor assembly, thereby shielding regions, which are located beyond the magnetizable material and above the lateral edge, from the electromagnetic field. The wording "above the lateral edge" means that the magnetizable material is also located directly above the lateral edge of the conductor assembly, i.e. above if viewed in the vertical direction.

Therefore, the emission of electromagnetic radiation towards regions of the surroundings which are located diagonal above the primary side conductor assembly is significantly reduced. This embodiment is particularly useful if the gap between the primary and the secondary side conductor assembly is very large. This embodiment is based on the consideration that such a shielding of the lateral edges slightly reduces efficiency of energy transfer to the secondary side, but significantly reduces emissions to the surroundings. Therefore, significantly higher transfer power to the secondary side can be achieved using the same primary side conductor assembly. For example, significantly higher electric currents may flow through the primary side conductor assembly.

The same advantage applies to the following embodiment of the secondary side shielding assembly which extends into a region below the lateral edge of the secondary side conductor assembly, thereby shielding regions, which are located beyond the magnetizable material and below the lateral edge, from the electromagnetic stray field. In particular, significantly higher electric currents may flow through the secondary side conductor assembly without violation of the applicable limits for the magnetic field. The wording "below the lateral edge" means that the magnetizable material is also located directly below the lateral edge of the conductor assembly, i.e. below if viewed in the vertical direction.

Using magnetizable material as shielding material has the advantage that flux lines of the magnetic field are guided within the material. Compared to the situation without the presence of the shielding material, at least some of the magnetic flux lines cannot permeate the magnetizable material. Instead, these magnetic flux lines are redirected in the direction of extension of the magnetizable material.

In particular, magnetizable material can be used which has small electric conductibility, for example ferrites. As a result, the effects of electric currents which are induced in the shielding material are reduced.

More generally speaking, the magnetizable material may be ferromagnetic, paramagnetic or ferrimagnetic. It is preferred that the magnetizable material has a magnetic susceptibility of at least 10, preferably at least 50.

According to another aspect of the present invention, the primary side conductor assembly and/or the secondary side conductor assembly is/are enclosed by the shielding assembly, wherein the outer shell made of the magnetizable material which encloses the conductor assembly has an opening through which the electromagnetic field propagates between the primary side and the secondary side. Especially in the region of the lateral edges of the conductor assembly, the shell may have the configuration described elsewhere in the description.

If the conductor assembly on the primary side or the secondary side comprises a plurality of parts, wherein each part comprises electrically conductive material which carries an electric current during operation, each of the parts may be shielded by a separate shielding assembly made of magnetizable material. Furthermore, it is possible that the shielding assemblies on the primary side or on the secondary side are mechanically connected to each other, i.e. the magnetizable material continuously extends along the electric conductors of different parts of the conductor assembly. For example, individual shielding assemblies may have a cross-sectional shape of a C or U, wherein the opening of the C-profile or U-profile is oriented towards the other side of the system for transferring electric energy by induction from the primary side to the secondary side. If, for example, two parts of the conductor assembly are shielded by shielding assemblies which are mechanically connected to each other, other cross-sectional shapes are possible, such as the shape of an E-profile in case of two parts. Again, the openings of the E are oriented towards the other side of the system. In any case, e.g. in the case of a C, U or E, it is preferred (as mentioned above) that the section of the shielding assembly which extends towards the other side of the system nearby the lateral edge of the shielded conductor assembly further extends into the gap between the primary side and secondary side of the system. For example, in case of a C-profile, the free ends of the C extend inwardly towards each other and leave a gap in between each other which is the opening of the shell mentioned above.

However, it is not necessary that opposite lateral edges of the conductor assembly are shielded by the same shielding assembly or in the same manner by the shielding assembly. Therefore, the cross-sectional shape may be the shape of a L-profile, for example, wherein one of the limbs of the L-profile may extend transversely within the gap between the primary side and the secondary side of the system. Alternatively, one of the two limbs of the L-profile may extend behind the conductor assembly (if viewed from the conductor assembly on the other side of the system) and the other limb of the L-profile may extend sideways of the conductor assembly. In any case, two L-profiles of magnetizable material may be used to shield the opposite lateral edges of a conductor assembly.

As principally known in the art, the type of magnetizable material may be adapted to the frequency of the alternating current, and therefore to the frequency of the electromagnetic field, which is generated during operation of the system. For example, the frequency is in the medium frequency range of some kHz.

According to an embodiment of the invention, the magnetizable material may be cut-out or may comprise gaps in between magnetizable material on the same side of the system. Despite these gaps, the magnetic flux lines are guided in the direction across the gap or transversely to the direction across the gap (depending on the configuration of the conductor assembly). Despite the gap, only a small amount of the electromagnetic field leaks through the gap to the surroundings, because the magnetizable material guides the magnetic flux lines within the material and the shape of the magnetic flux lines can only slightly deform in the gap nearby the magnetizable material.

For example, a lateral edge of the conductor assembly may be shielded by magnetizable material. Along the extension of the lateral edge in a direction transversely to the direction which connects the primary side and the secondary side, the magnetizable material of the shielding assembly comprises at least one gap and preferably several gaps.

A gap in between parts of the magnetizable material has the advantage that the required amount of magnetizable material is reduced and, therefore, weight and costs are saved.

According to a further aspect of the present invention, the primary side conductor assembly and/or the secondary side conductor assembly, which extend in a direction transverse to the direction from the primary side to the secondary side, thereby defining edges where the extension of the conductor assembly terminates, is/are combined with magnetizable material. This magnetizable material shields the surroundings from the magnetic field(s) produced by the primary side conductor assembly and/or produced by the secondary side conductor assembly. In addition, this magnetizable material extends along the extension of the respective conductor assembly and further extends beyond at least one of the edges of the respective conductor assembly. In other words: the magnetizable material covers at least partially the conductor assembly, if viewed from the surroundings, and the cover extends beyond the edge of the conductor assembly.

The word "cover" not only includes cases, in which the magnetizable material is located above the secondary side conductor assembly or below the primary side conductor assembly, but also includes cases, in which the magnetizable material is located in the horizontal direction of the conductor assembly, i.e. is located on the same level as the conductor assembly. In the latter case, extending beyond the edge means that the magnetizable material extends beyond the edge in horizontal direction and/or in vertical direction.

Due to the extension beyond the respective edge, the shielding effect is improved. If shielding assembly of magnetizable material is elongated in a longitudinal direction and has a cross-sectional shape of a C or a U (see above), thereby enclosing at least part of the conductor assembly, it is preferred that the shielding assembly extends beyond the edge or edges of the conductor assembly in the longitudinal direction.

BRIEF DESCRIPTION OF THE DRAWINGS

In the following, examples of the invention will be described with reference to the attached figures. The figures show.

Figure 1:
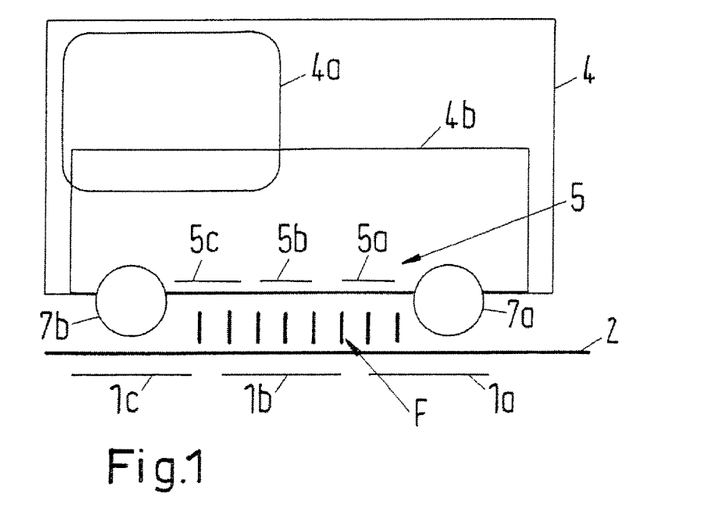
FIG. 1 schematically a vehicle comprising a receiver (sometimes also called: pickup) for receiving an electromagnetic field which is generated by a primary side conductor assembly, FIG. 2 an arrangement comprising a primary side or secondary side conductor assembly and further comprising a shielding assembly made of magnetizable material, FIG. 3 a three-dimensional representation of part of an arrangement comprising a conductor assembly and a shielding assembly, FIG. 4 schematically a cross-sectional view of a secondary side arrangement comprising a conductor assembly and a shielding assembly, FIG. 5 schematically a cross-sectional view of a conventional arrangement comprising a secondary side conductor assembly and a shielding plate made of magnetizable material, wherein the shielding plate is located above the conductor assembly, FIG. 6 a modification of the arrangement shown in FIG. 5 comprising a shielding assembly made of magnetizable material, wherein the shielding assembly also shields regions sideways of the conductor assembly from the electromagnetic stray field which is produced during operation of the conductor assembly, FIG. 7 schematically a top view of a conductor assembly covered by a shielding assembly, illustrating that the shielding assembly extends beyond edges of the conductor assembly.

The vehicle 4 which is shown in FIG. 1 comprises wheels 7a, 7b for traveling on a track 2. For example, the vehicle 4 may be a road automobile (such as a private automobile or a bus) or may be a track bound vehicle, such as a rail vehicle. Details of the road or railway are not shown in FIG. 1.

DESCRIPTION OF THE INVENTION

There is an arrangement of electrically conducting material combined with (e.g. embedded in) the track 2. For example, there are three phase conductors 1a, 1b, 1c for carrying the three phases of a three-phase alternating current during operation. The electrically conducting material which is embedded in the track or is part of the track 2 forms the primary side conductor assembly. During operation, the primary side conductor assembly 1 produces an electromagnetic field. The magnetic field lines F are schematically indicated in FIG. 1. However, the field lines F are not completely shown. Rather, only the nearly homogeneous area of the magnetic field in the gap between the primary side and the secondary side is illustrated by flux lines.

The vehicle 4 comprises a receiver 4b for receiving the electromagnetic field and for producing electric energy by magnetic induction. For this purpose, the receiver 4b comprises a secondary side conductor assembly 5. In the specific embodiment shown, this secondary side conductor assembly 5 comprises three phase lines 5a, 5b, 5c for producing a three-phase alternating current. The phase lines may be coils comprising several windings of an elongated electric conductor. Optionally, each phase line may comprise a plurality of coils.

FIG. 1 also schematically shows an energy storage 4a for storing the electric energy which is produced by the receiver 4b. Other electric and/or electronic parts on board the vehicle 4, which may be used for providing the produced electric energy to any electric consumer, are not shown in FIG. 1.

Figure 2:
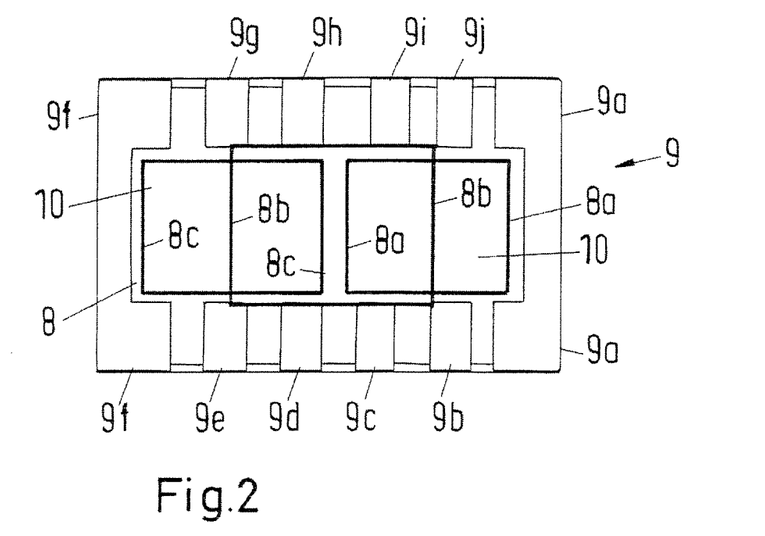

FIG. 2 schematically shows a top view or a bottom view of a primary side or secondary side arrangement comprising a conductor assembly 8 and a shielding assembly 9 made of magnetizable material. FIG. 2 illustrates the basic idea of a preferred embodiment of the invention, namely using separate parts 9a-9j of magnetizable material, wherein the parts 9a-9j are located at distances to neighboring parts 9a-9j, so that there are gaps in between the parts 9a-9j. At the same time, the different parts 9a-9j are arranged so that the conductor assembly 8 is enclosed together by the parts 9a-9j and by the gaps in between the parts 9a-9j.

The arrangement shown in FIG. 2 may be the arrangement on the primary side of a system for inductively transferring energy to a vehicle or may be the secondary side arrangement on board the vehicle. In any case, the direction which connects the primary side and the secondary side extends perpendicular to the image plane of FIG. 2.

The configuration of the conductor assembly 8 shown in FIG. 2 is just an example. Any other configuration can be enclosed by the shielding assembly 9. In the example of FIG. 2, the conductor assembly 8 comprises three coils 8a, 8b, 8c of electric lines. For example, each coil may produce a different phase of a three-phase alternating current or may carry one phase of a three-phase alternating current during operation.

As mentioned, the parts 9a-9j of the shielding assembly 9 enclose the conductor assembly 8. The term "enclosed" refers to the top view or bottom view of the arrangement shown in FIG. 2. If, for example, the illustration of FIG. 2 is a top view of a primary side arrangement, it is preferred (but not required) that there is additional magnetizable material behind (i.e. below) the conductor assembly 8, so that the regions below the conductor assembly 8 are also shielded from the electromagnetic field. However, the shielding assembly 9 comprises an opening 10 towards the other side of the system, so that the magnetic flux lines can extend from the primary side to the secondary side conductor assembly through the opening 10.

Figure 3:
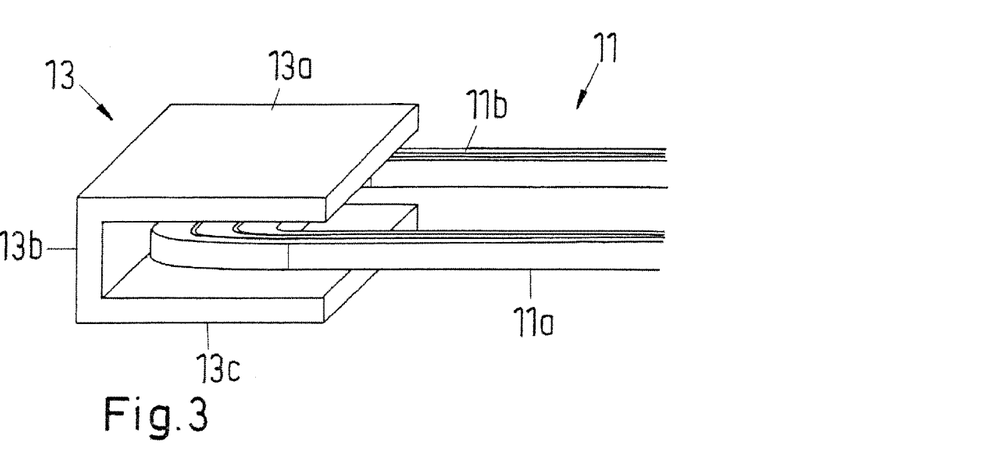

FIG. 3 shows a part of a coil 11 of a primary or secondary side conductor assembly. In the foreground of the figure, a first section 11a of the coil 11 extends from right to left towards a lateral edge, where the electric lines of the coil 11 are redirected and reversed. Consequently, the background of FIG. 3 comprises the reversed section 11b of the coil 11 which extends in parallel to the first section 11a.

The lateral edge of the coil 11, where the electric lines of the coil 11 are reversed, is surrounded by magnetizable material of a shielding assembly 13 on three sides, namely the bottom side, the side in horizontal direction and the top side. In the example shown, the shielding assembly 13 comprises flat, plate-like parts 13a, 13b, 13c on these three sides of the lateral edge of the coil 11. The shielding assembly 13 has the cross-sectional shape of a U-profile. In practice, the U-profile may extend much further towards the foreground and/or the background of FIG. 3 than shown in FIG. 3. In addition, the shielding assembly may comprise further parts, such as a part shielding the region above the sections 11a, 11b or the regions below the sections 11a, 11b.

Figure 4:
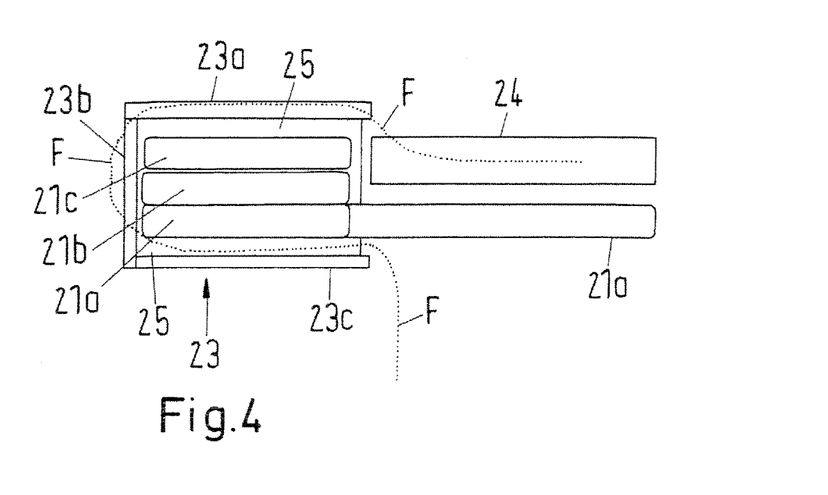

The conductor assembly 21 which is shown in FIG. 4 comprises elements 21a, 21b and 21c on different height levels. The conductor assembly 21 is not completely shown in FIG. 4. Rather, the element 21a may extend further towards the right and may end at a lateral edge which is configured in the same manner or similar manner as the lateral edge shown on the left hand side of FIG. 4. The elements 21a, 21b, 21c may belong to different phase lines of the conductor assembly 21.

The lateral edge of the conductor assembly 21, which is shown in FIG. 4, is surrounded by a shielding assembly 23 in the same manner as has been described in connection with FIG. 3. A first element 23a made of magnetizable material is placed above the lateral edge of conductor assembly 21, a second part 23b of magnetizable material is placed on the left hand side (in horizontal direction) of the lateral edge and a third part 23c of magnetizable material is placed below the lateral edge. The parts 23a, 23b, 23c may be mechanically connected to the elements 21a, 21b, 21c by electrically insulating material 25 which fills at least some of the gaps between the elements 21a, 21b, 21c and the parts 23a, 23b, 23c. The first element 23a of the shielding assembly 23 extends in horizontal direction beyond the lateral edge of the conductor assembly 21.

There is an additional part 24 of magnetizable material which extends above the element 21a in the area which starts on the right hand side of elements 21b, 21c and extends towards the right, where the opposite lateral edge of the conductor assembly 21 may be located. Therefore, the region above the element 21a is shielded from the magnetic field. Consequently, the arrangement shown in FIG. 4 is a secondary side arrangement and the direction from the primary side to the secondary side extends from bottom to top in FIG. 4. However, it would be possible to configure a primary side arrangement in the same manner as shown in FIG. 4, wherein the configuration is symmetric to the horizontal line at the bottom of FIG. 4. This horizontal line (not shown in FIG. 4) would divide the gap between the primary side arrangement and the secondary side arrangement in two equal halves.

FIG. 4 also shows the effect of the shielding assembly 23, 24. A single magnetic flux line extends from the bottom of FIG. 4 towards the element 21a, but is redirected by the shielding assembly 23 around the lateral edge of the conductor assembly 21 and follows the extension from left to right of the part 24 made of magnetizable material.

Figure 5:
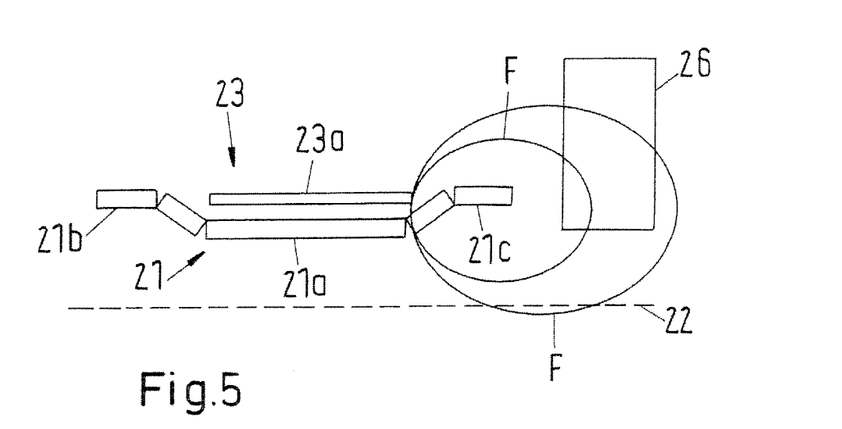

The secondary side arrangement shown in FIG. 5 comprises a conductor assembly 21 which is schematically represented by a broad line extending from left to right. The lateral edges 21b, 21c of the conductor assembly 21 are located at a higher level than the middle part 21a of the conductor assembly 21.

There is a plate-like element 23a made of magnetizable material which is placed above the middle section 21a and which constitutes a shielding assembly 23. The dashed horizontal line 22 in FIG. 5 indicates the surface of a track of the vehicle or indicates the horizontal line which divides the gap between the primary side arrangement (not shown in FIG. 5) and the secondary side arrangement in two equal halves.

The electromagnetic stray field which is produced during operation of the conductor arrangement 21 is represented by magnetic flux lines F only on the right hand side of FIG. 5. These two magnetic flux lines F extend through an area 26 which is located sideways of the conductor assembly 21. Consequently, the field strength of the electromagnetic stray field is high in the area 26.

Figure 6:
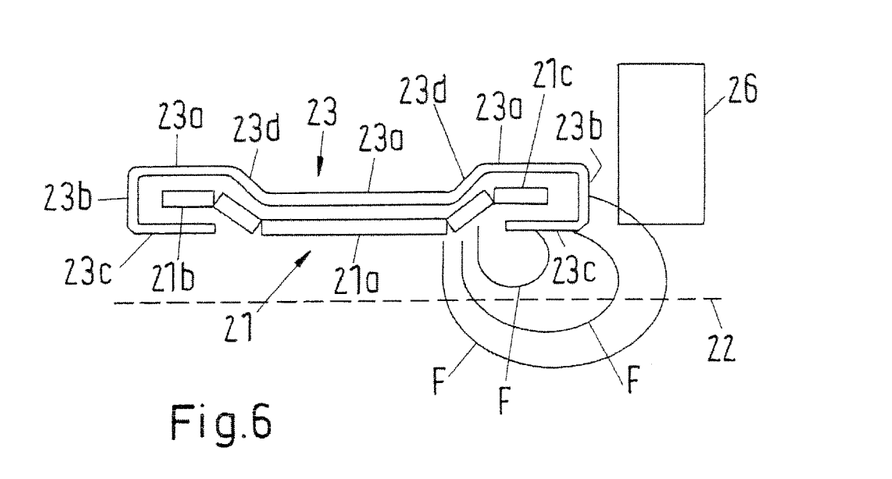

According to the invention, the arrangement shown in FIG. 5 is modified by additional parts or sections of the shielding assembly 23 shown in FIG. 6.

Nearby both lateral edges 21b, 21c of the conductor assembly 21, three parts 23a, 23b, 23c (which may alternatively be called sections) of magnetizable material are placed above, sideways and below the lateral edge in a similar manner as shown in FIG. 3 and FIG. 4. In addition, the central part 23a above the middle part 21a of the conductor assembly 21 is connected to the top parts 23a via intermediate parts or sections 23d made of magnetizable material.

As a result, the magnetic field lines F of the electromagnetic stray field extend in a different manner compared to the situation in FIG. 5. As a result, the field strength in the area 26 sideways of the lateral edge is much smaller.

Figure 7:
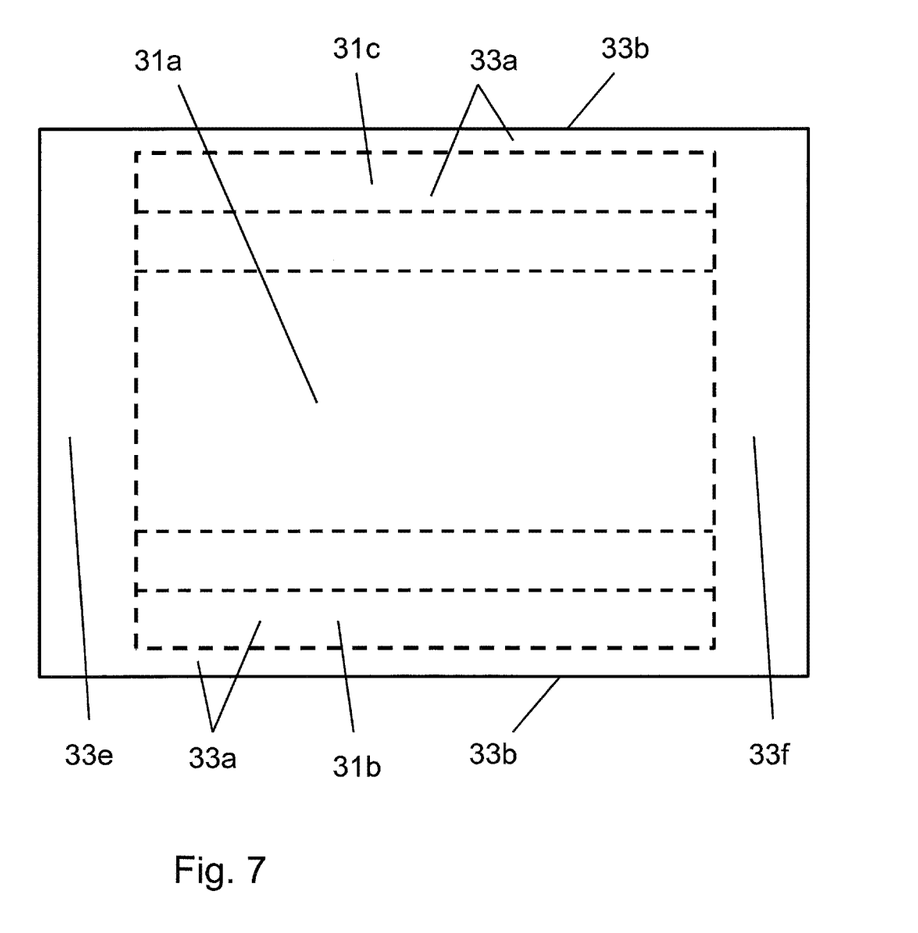

FIG. 7 shows the rectangular outline of a shielding assembly 33 made of magnetizable material covering a conductor assembly 31. The shielding assembly 33 comprises different regions 33a, 33b, 33e, 33f. The conductor assembly comprises different parts or regions 31a, 31b, 31c, 31d comprising in each case sections of electrically conducting lines. The outline of the conductor assembly 31 and the limitations of its parts or regions 31a, 31b, 31c, 31d are shown by dashed lines, indicating that the conductor assembly 31 would not be visible through the shielding assembly 33.

The horizontal direction in FIG. 7, for example, corresponds to the longitudinal direction of the arrangement 31, 33, wherein the shielding assembly 33 may extend above the conductor assembly on the secondary side of an IPT system. In particular, the arrangement 31, 33 may be formed as shown in FIG. 6. In this case, the regions 31a, 31b, 31c, 31d of the conductor assembly 31 correspond to the sections 21a, 21b, 21c, 21d of the conductor assembly 21 shown in FIG. 6 and the regions 33a, 33b of the shielding assembly 33 correspond to the parts 23a, 23b of the shielding assembly 23 shown in FIG. 6.

Therefore, the C-shaped profile of the shielding assembly 23 or 33 extends in the longitudinal direction beyond the edges (shown by vertical dashed lines in FIG. 7) of the conductor assembly 31. The regions of the shielding assembly 33 which are located beyond the edges of the conductor assembly 31 in longitudinal direction are denoted by reference numerals 33e, 33f in FIG. 7. Preferably, the regions 33e, 33f are also part of a C-shaped profile, as this is the case for the parts 23a, 23b, 23c shown in FIG. 6, thereby enclosing the edge of the conductor assembly on three sides.

In addition, as mentioned above in connection with FIG. 4, the regions 33a of the shielding assembly 33 extend in lateral direction beyond the edges (shown by horizontal dashed lines in FIG. 7) of the conductor assembly 31.

As a result, the surroundings are shielded from magnetic fields produced by the IPT system in a highly effective manner.

The invention claimed is:

1. An apparatus for providing a land vehicle with electric energy by producing an electromagnetic field on a primary side located on a track of the vehicle or located at a stop of the vehicle, by receiving a magnetic component of the electromagnetic field on a secondary side onboard the vehicle above a source of the electromagnetic field and by magnetic induction on the secondary side, the apparatus comprising:

a primary side conductor assembly made of electrically conducting material as the source of the electromagnetic field, wherein the primary side conductor assembly produces the electromagnetic field during operation while the electrically conducting material carries an alternating electric current, and a primary side shielding assembly made of magnetizable material, wherein the primary side shielding assembly or a part of the primary side shielding assembly extends sideways of the primary side conductor assembly on a same height level as the primary side conductor assembly, thereby shielding regions, which are located beyond the magnetizable material, from the electromagnetic field, wherein the primary side shielding assembly extends from sideways of the primary side conductor assembly to a height level above a height level of a lateral edge of the primary side conductor assembly, thereby also shielding regions, which are located beyond the magnetizable material and at a higher height level as the lateral edge of the primary side conductor assembly, from the electromagnetic field, and wherein the magnetizable material of the primary side shielding assembly is also located, if viewed in the vertical direction, above the lateral edge of the primary side conductor assembly within a gap between the primary side conductor assembly and the secondary side conductor assembly.

2. An apparatus for providing a land vehicle with electric energy by producing an electromagnetic field on a primary side located on a track of the vehicle or located at a stop of the vehicle, by receiving a magnetic component of the electromagnetic field on a secondary side onboard the vehicle using a secondary side conductor assembly located above a primary side conductor assembly, which is a source of the electromagnetic field, and by magnetic induction on the secondary side, the apparatus comprising:

the secondary side conductor assembly, which is made of electrically conducting material which produces an electromagnetic stray field during operation while the electrically conducting material carries an alternating electric current, and a secondary side shielding assembly made of magnetizable material, wherein the secondary side shielding assembly or a part of the secondary side shielding assembly extends sideways of the secondary side conductor assembly on a same height level as the secondary side conductor assembly, thereby shielding regions, which are located beyond the magnetizable material, from the electromagnetic stray field, wherein the secondary side shielding assembly extends from sideways of the secondary side conductor assembly to a height level below a height level of a lateral edge of the secondary side conductor assembly, thereby also shielding regions, which are located beyond the magnetizable material and at a lower height level as the lateral edge of the secondary side conductor assembly, from the electromagnetic stray field, and wherein during operation of the secondary side conductor assembly, the magnetizable material of the secondary side shielding assembly is also located, if viewed in the vertical direction, below the lateral edge of the secondary side conductor assembly within a gap between the primary side conductor assembly and the secondary side conductor assembly.

3. A land vehicle comprising the apparatus of claim 2.

4. A method of providing a land vehicle with electric energy by producing an electromagnetic field on a primary side located on a track of the vehicle or located at a stop of the vehicle, for receiving a magnetic component of the electromagnetic field on a secondary side onboard the vehicle using a secondary side conductor assembly located above a source of the electromagnetic field by magnetic induction on the secondary side, the method comprising:

conducting an alternating electric current through a primary side conductor assembly made of electrically conducting material to produce the electromagnetic field, and shielding regions, which are located sideways of the primary side conductor assembly from the electromagnetic field using a primary side shielding assembly, which or a part of which extends sideways of the primary side conductor assembly on a same level as the primary side conductor assembly, wherein the primary side shielding assembly is made of magnetizable material, wherein the primary side shielding assembly, which extends from sideways of the primary side conductor assembly to a height level above a height level of a lateral edge of the primary side conductor assembly, is also used to shield regions from the electromagnetic field, which regions are located beyond the magnetizable material and at a higher height level as the lateral edge of the primary side conductor assembly, and wherein the magnetizable material of the primary side shielding assembly, which is also located, if viewed in the vertical direction, above the lateral edge of the primary side conductor assembly within a gap between the primary side conductor assembly and the secondary side conductor assembly, is also used to shield regions from the electromagnetic field, which regions are located beyond the magnetizable material and above the lateral edge of the primary side conductor assembly.

5. A method of providing a land vehicle with electric energy by receiving, on a secondary side onboard the vehicle, a magnetic component of an electromagnetic field produced on a primary side located below the vehicle on a track of the vehicle or at a stop of the vehicle, and by magnetic induction on the secondary side, using a secondary side conductor assembly located above a primary side conductor assembly, which is a source of the electromagnetic field, the method comprising:

receiving the electromagnetic field by the secondary side conductor assembly made of electrically conducting material which produces an electromagnetic stray field during operation while the electrically conducting material carries an alternating electric current, and shielding regions, which are located sideways of the secondary side conductor assembly from the electromagnetic stray field using a secondary side shielding assembly, which or a part of which extends sideways of the secondary side conductor assembly on a same height level as the secondary side conductor assembly, wherein the secondary side shielding assembly is made of magnetizable material, wherein the secondary side shielding assembly, which extends from sideways of the secondary side conductor assembly to a height level below a height level of a lateral edge of the secondary side conductor assembly, is also used to shield regions from the electromagnetic stray field, which regions are located beyond the magnetizable material and at a lower height level as the lateral edge of the secondary side conductor assembly, and wherein while the electromagnetic field is received by the electrically conducting material of the secondary side conductor assembly, the magnetizable material of the secondary side shielding assembly, which is also located, if viewed in the vertical direction, below the lateral edge of the secondary side conductor assembly within a gap between the primary side conductor assembly and the secondary side conductor assembly, is also used to shield regions from the electromagnetic field, which regions are located beyond the magnetizable material and below the lateral edge of the secondary side conductor assembly.

* * * * *